Oct. 15, 1929.　　　H. C. MALLORY　　　1,731,583
VAPORIZING FUEL FOR INTERNAL COMBUSTION ENGINES
Filed March 17, 1922　　2 Sheets-Sheet 1
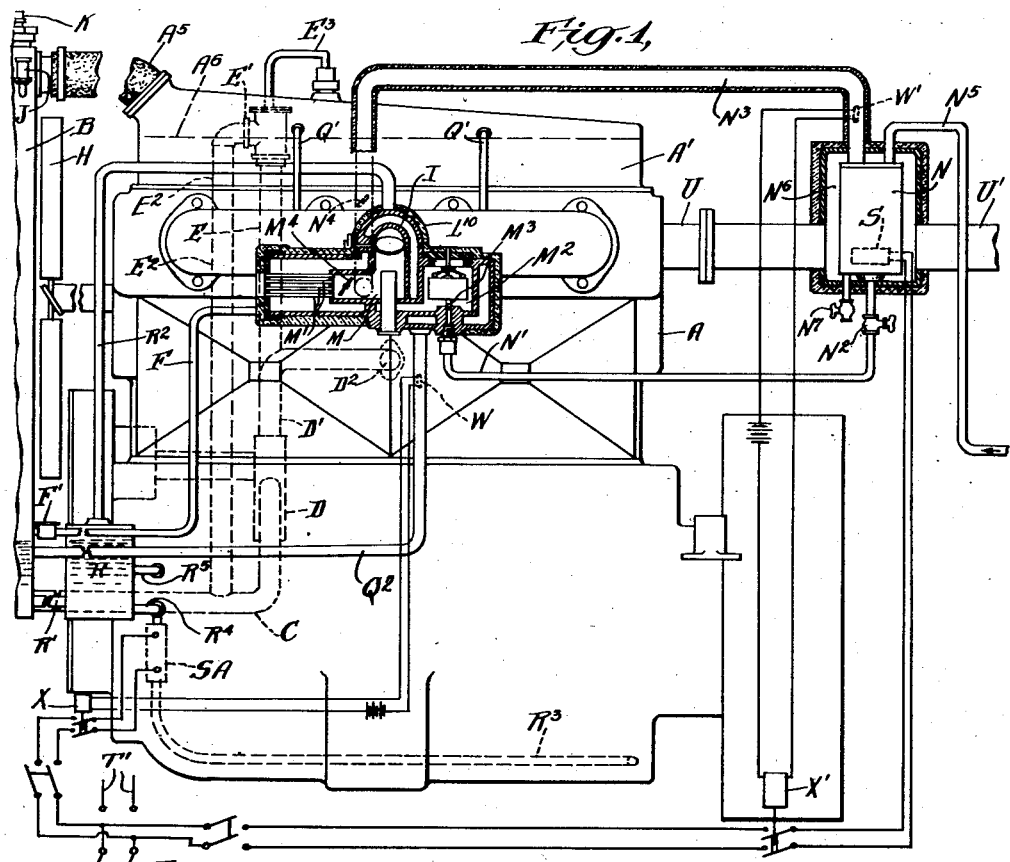
Fig.1,
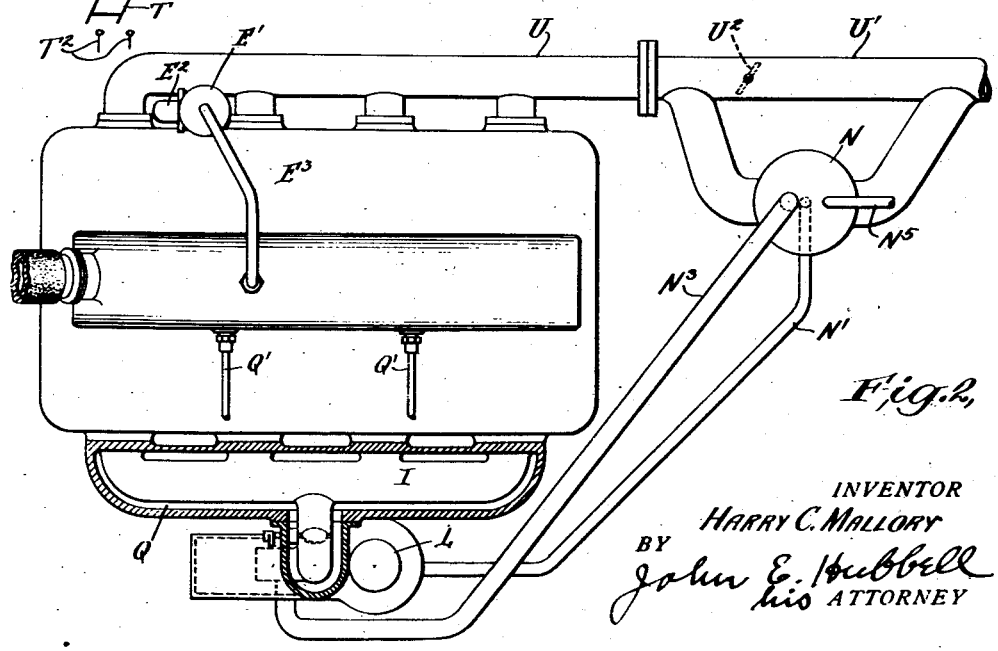
Fig.2,
INVENTOR
HARRY C. MALLORY
BY John E. Hubbell
his ATTORNEY

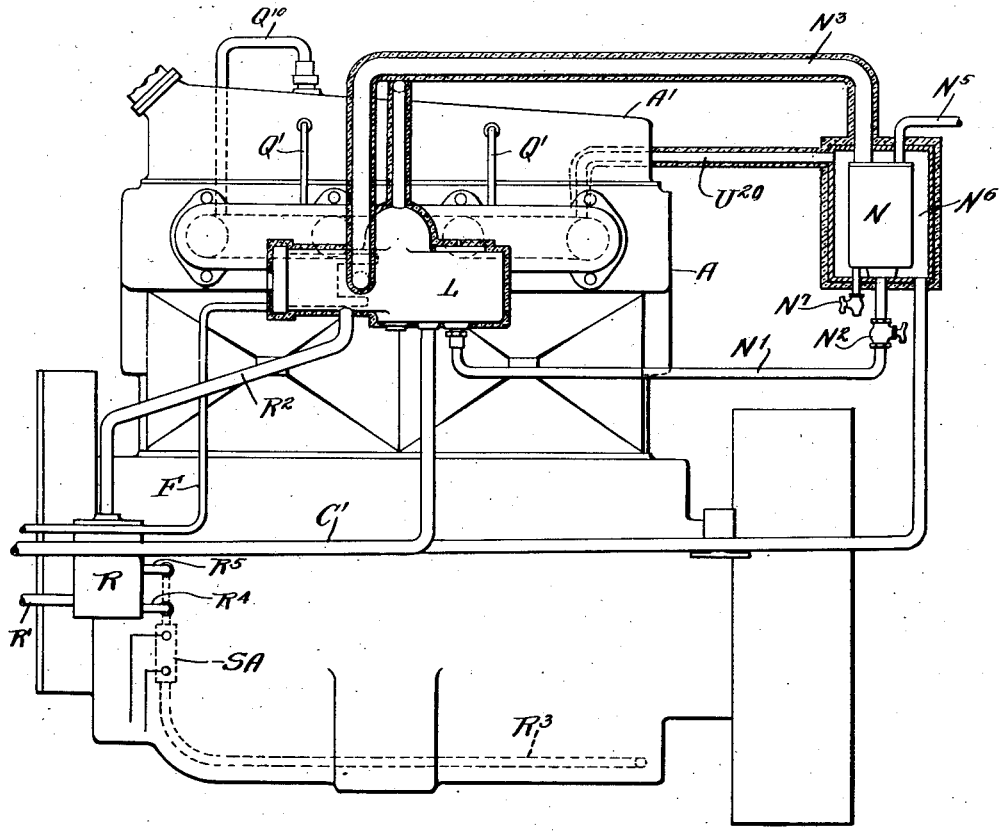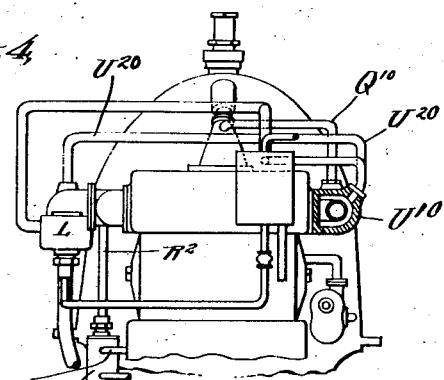

Patented Oct. 15, 1929

1,731,583

UNITED STATES PATENT OFFICE

HARRY C. MALLORY, OF NEW YORK, N. Y.; SUE R. MALLORY ADMINISTRATRIX OF SAID HARRY C. MALLORY, DECEASED

VAPORIZING FUEL FOR INTERNAL-COMBUSTION ENGINES

Application filed March 17, 1922. Serial No. 544,596.

The general object of the present invention is to provide a simple and effective method of and means for vaporizing fuel oil for an internal combustion engine preparatory to its admixture with air and introduction into the engine cylinders. The invention is especially adapted for use in automobile engines though not necessarily restricted to such use, and in the preferred mode of carrying out my invention I vaporize the fuel oil required in normal operation wholly, or in part, by waste heat from the engine itself. This waste heat may be furnished by the exhaust gases from the engine cylinders, or by the fluid circulating through the engine cooling system. With either source of waste heat I advantageously provide an auxiliary heating device for use when the engine is idle to vaporize fuel oil preparatory to starting the engine into operation, and to supplement the supply of waste heat when the engine is running, if and when this becomes necessary. Advantageously my improved fuel vaporizing means are combined with provisions heretofore devised by me for utilizing waste heat from the engine in heating portions of the engine structure to facilitate the starting of the engine, and increase its efficiency in regular operation.

The various features of novelty which characterize my invention are pointed out with particularity in the claims annexed to and forming a part of this specification. For a better understanding of the invention, however, and the advantages and specific objects attained with its use, reference should be had to the accompanying drawings and descriptive matter in which I have illustrated and described preferred constructions and modes of carrying out my invention.

Of the drawings:

Fig. 1 is an elevation with parts broken away and in section of an automobile engine in which the heat of the exhaust gases is utilized in vaporizing the charge forming fuel oil;

Fig. 2 is a plan view of the apparatus shown in Fig. 1;

Fig. 3 is a view taken similarly to Fig. 1, illustrating means for utilizing heat derived from the engine cooling system in vaporizing the charge forming fuel oil; and Fig. 4 is an end elevation of the engine shown in Fig. 3.

In the drawings, and referring first to the construction shown in Figs. 1 and 2, A represents an internal combustion engine of which I represents the intake manifold, and U the exhaust gas outlet. To the inlet manifold I there is connected a carburetor L. The latter is shown as of conventional type comprising an air and fuel mixing chamber M discharging to the intake I, and receiving air through the supply pipes M', and adapted to receive oil in liquid form from the usual oil chamber $M^2$, the latter being supplied with oil through the conduit N', the amount of oil thus supplied being regulated by the usual float $M^3$. The pipe N' leads from the bottom of an oil tank N. A stop valve $N^2$ is provided in the pipe N' for closing the latter when this is desirable. A pipe $N^3$ leads from the top of the tank N to the air and fuel mixing chamber M of the carburetor L opening to the latter at the inlet side of the throttle valve or damper $M^4$ which regulates the admission of air to the chamber L through the pipes M'. A throttle valve $N^4$ regulates the passage of vapor through the pipe $N^3$, and the two throttle valves $M^4$ and $N^4$ may advantageously be connected to the same operating lever or other control device (not shown) for regulating the fuel charges supplied to the engine cylinders. $N^5$ represents the supply line to the tank N from the main oil supply tank or reservoir which is not shown. Any usual or suitable means may be employed for regulating the supply of oil to the tank N through the pipe $N^5$ as required to maintain the latter partially filled. The tank N is surrounded by an enclosed jacket space $N^6$ which is connected in the exhaust gas outlet piping. Advantageously as shown in Fig. 2, this piping comprises a by-pass U' about the jacket space $N^6$ and a valve or damper $U^2$ regulates the portions of the engine exhaust gases passing, respectively, through the jacket $N^6$, and through the by-pass U'. $N^7$ represents a blow-off or drain cock connection to the bottom of the tank N, and S represents an auxiliary heater for the tank N which may advantageously be an electric heater.

In the normal contemplated mode of operation of the oil vaporizing provision shown in Figs. 1 and 2, the valve $N^2$ in the pipe $N'$ is closed, and oil is supplied to the tank as required to keep the latter partly filled with oil which is vaporized therein as rapidly as required to supply the demand of the engine for fuel. The vaporized oil passes from the tank N through the pipe $N^3$ to the air and fuel mixing chamber M of the carburetor L. In regular operation the heat for vaporizing the oil in the tank N is furnished by the exhaust gases passing through the jacket space $N^6$. Since the exhaust gases are capable of furnishing more heat to the tank N than is normally required to vaporize the fuel required by the engine, the damper $U^2$ will normally be set to permit a portion of the engine exhaust gases to flow through the by-pass $U'$. Thermostatic provisions may be provided for adjusting the damper $U^2$ to insure an approximately constant temperature at the vapor outlet from the oil vaporizer N in normal operation as required. The auxiliary heater S forms a means for heating the tank N preparatory to starting the engine into operation, and may be employed when the engine is running to augment the heat supplied to the tank N by the engine exhaust gases, if and when this may be desirable. The auxiliary heater S, while desirable, may sometimes be dispensed with, in which case the engine may be started by oil passed in liquid form from the tank N through the pipe $N'$ into the oil chamber of the carburetor, the valve $N^2$ being then open. By heating the oil to vaporize it preparatory to its carburation, the efficiency of the carbureting operation and thereby of the engine itself may be substantially enhanced. Advantageously the tank N and pipe $N^3$ are insulated against heat losses.

My present invention, in the form illustrated in Figs. 1 and 2 may advantageously be combined with the means such as those disclosed and claimed in my prior application, Serial No. 257,504, filed January 6, 1922, which I have heretofore devised for utilizing heat derived from the engine cooling system in heating the engine charge forming and supply connections and other portions of the engine, to facilitate starting the engine, and to increase its efficiency in regular operation.

In the combination of this character illustrated in Figs. 1 and 2, the engine cooling system shown comprises a cooling jacket $A'$ surrounding the engine cylinders and the inlet and exhaust valve casings. Normally the jacket $A'$ is partially filled with a cooling liquid such as water, or a water alcohol mixture. A pipe connection $A^5$ leads from the vapor space in the jacket $A'$ to the top of an air cooled surface condenser B. A pump D draws liquid from the bottom of the condenser B through the conduit C and passes it through the conduit $D'$ into the bottom of the engine jacket space $A'$ at $D^2$. F represents an air exhausting connection to the condenser from the suction intake manifold I of the engine. Advantageously the pipe F includes an air valve $F'$ permitting the free flow of air out of the condenser but restricting the escape of liquid or vapor from the latter. J represents a vacuum relief valve set to admit air to the condenser when the vacuum or minus pressure in the latter exceeds a predetermined amount. E, $E'$ and $E^2$ represent a bypass connection about the pump D the purpose of which is to normally maintain liquid in the engine jacket approximately to the level $A^6$, and thus insure at all times a free vapor space in the top of the jacket while preventing the jacket from draining when the engine and pump are idle. Advantageously a pressure equalizing connection $E^3$ is provided between the top of the engine jacket and the top of the bypass connection to prevent the latter from becoming air bound and also to prevent the engine jacket from being drained by a siphon discharge through the bypass connection.

The carburetor L, intake pipes $M'$, and manifold I are all jacketed, and as shown, these parts are all enclosed by a single jacket Q. $Q'$ represents inlets to the jacket Q from the vapor space in the engine cooling system. As shown the inlets Q open from the jacket $A'$ well above the normal liquid level $A^6$ in the latter. $Q^2$ represents a drain connection from the jacket Q through which liquid of condensation forming in the latter is returned to the engine cooling system at some point in the latter at the inlet side of the pump D, and through which any air entering the jacket Q will tend to flow by gravity into the condenser. As shown in Figs. 1 and 4, the drain connection $Q^2$ opens into the bottom tank or hot well of the condenser B above the liquid level normally maintained in the latter.

A common heating system is provided to heat the engine crank case and to supply heat to the engine charge forming connections preparatory to starting the engine into operation. This heating system, in the form shown, comprises a small tank R which is connected by the pipe $R'$ to the hot well $B'$ of the condenser below the water levels in the tank and hot well. A vapor outlet connection $R^2$ runs from the top of the tank R to the jacket Q. Associated with the tank R is a pipe $R^3$ which extends into and forms the heating device for the crank case. One end $R^4$ of the pipe $R^3$ is connected to the tank R at a lower level, while the other end $R^5$ of the pipe $R^3$ is connected to the tank R at an upper level which, however, is below the normal water level in the tank. Suitable provisions are made for supplying heat to the auxiliary heating system in such manner as to effect a circulation through the pipe $R^3$. In the construction shown heat is thus supplied by means of an electric heater SA which furnishes heat to the riser portion of the pipe $R^3$ between the end $R^4$ and the body of the pipe $R^3$, the latter as shown, being located at the bottom of the crank case so that normally it is wholly or partially immersed in the lubricant therein. The heat supplied by the heater SA sets up a gravity water circulation through the pipe $R^3$, the water flowing into the pipe through its end $R^5$ and out of the pipe through its end $R^4$. From the water circulating system thus provided, the pipe connection $R^2$ forms a vapor outlet which supplies vapor to the jacket Q. The tank R provides an enlarged portion of the water circulating system which facilitates the disengagement of the vapor passing through the jacket Q.

When the engine A is mounted on an automobile provided with an electric lighting and engine starting system, suitable provisions are advantageously made for connecting the heaters S and SA at will to the electric lighting and engine charging system, and also to some external source of electric current, when this is desirable as in warming up the engine in a garage preparatory to starting it into operation. For this purpose I show diagrammatically in Fig. 1 a double throw switch T by which the terminals of the heating coils S and SA may be optionally connected to leads T' from the engine lighting and starting system, or to contacts $T^2$ adapted to be connected to an external electric supply system, or may be disconnected both from the leads T' and the contacts $T^2$.

In the preferred contemplated mode of operation of the apparatus shown in Figs. 1 and 2, heat is ordinarily supplied to the tank R only in warming up the engine preparatory to starting in cold weather, or in keeping the engine warm enough to prevent freezing in cold weather. With the engine A in operation, as much of the vapor generated in the jacket space A' passes through the connections Q' into the charge supply connection jacket Q, as is required to maintain a temperature in the latter which is the same as the temperature in the vapor space of the jacket A'. The remainder of the vapor generated in the jacket A' passes to the condenser B through the vapor connection $A^5$ and is condensed in the latter. The liquid of condensation formed in the jacket Q passes back into the cooling system proper through the drain connection $Q^2$ and tank R, and mixes with the liquid of condensation formed in the condenser B.

When the heater SA is in operation, all the vapor generated therein passes directly to the jacket Q through the connection $R^2$ and heats the enclosed parts of the charge supply connections. Vapor thus supplied by the tank R to the jacket A', and not condensed in the latter, passes into the vapor space of the engine cooling system proper through the connections Q' and is condensed therein. The portion of the vapor from the tank R which will thus pass into the engine jacket Q will depend of course on the design of the apparatus which may be proportioned to keep the amount of vapor entering the jacket A' insignificant in amount in some cases and large enough in other cases to prevent freezing in the engine jacket or condenser.

The heating of the engine charge forming connections thus provided for minimizes any tendency to cooling and consequent condensation of the fuel vaporized in the tank N and tends to insure the delivery of air fuel charges to the engine cylinders at a desirably high and approximately constant temperature under varying conditions of use, which, as those skilled in the art know, tends to maximum efficiency and reliability of the carbureting apparatus. Only a comparatively small amount of water need be held in the tank R and coil $R^3$ and the amount of heat required to be furnished by the coil SA is comparatively small, especially if the tank R and exposed piping are insulated against heat radiation losses.

The use of auxiliary heating means for supplying heat to the engine crank case and to the engine charge forming connections when the engine is idle greatly facilitates the operation of starting the engine especially in cold weather.

In lieu of vaporizing the engine fuel oil by passing the engine exhaust gases through the oil vaporizing apparatus, I may make that jacket space a part of the circulation path of the engine cooling system. For example, the jacket space $N^6$ of the oil vaporizing apparatus shown in Figs. 1 and 2 might be connected into the engine cooling system in the same manner as the charge forming jacket space Q of Figs. 1 and 2 is connected. Advantageously, however, when vapor from the engine cooling system is utilized to heat the fuel vaporizing apparatus, this vapor, after leaving the engine jacket is superheated by means of the engine exhaust gases and in Figs. 3 and 4 I have illustrated apparatus for this purpose.

The engine cooling system shown in Figs. 3 and 4 differs from that shown in Figs. 1 and 2 essentially only in that a jacket $U^{10}$ is placed about the exhaust manifold U and one or more connections $Q^{10}$ pass vapor from the top of the jacket A' into the jacket $U^{10}$, and one or more connections $U^{20}$ are provided for passing the vapor superheated in the jacket $U^{10}$ into the jacket space Q and into the oil vaporizer jacket $N^6$. In Figs. 3 and 4, also, the direct connections Q from the jacket A' to the jacket spaces Q and N⁶ are omitted.

With the apparatus shown in Figs. 3 and 4, when the engine is in operation, the temperature in the jacket spaces Q and N⁶ will be maintained substantially above the temperature in the cooling jacket A' by the superheat imparted to the vapor passing through the jacket U¹⁰. It will be understood, of course, that the connections providing the path of flow for the vapor supplied to the jackets Q and N⁶ from the engine cooling jacket A' should be of such relatively small flow resistance as compared with the flow resistance of the vapor path from the jacket A' into and through the condenser B that in regular operation a sufficient supply of vapor will continuously pass into the jackets Q and N⁶ to make up the vapor condensation occurring therein.

To avoid an over supply of heat by the auxiliary heating means, provisions may be made for automatically regulating the supply of heat in response to the heating effect produced. For example, in the form of my invention shown in Figs. 1 and 2, a thermostat W provided in the return pipe Q² from the jacket space Q, is adapted to operate an electromagnetic control valve X so as to open or close the circuit through the heating coil SA accordingly as the temperature in the pipe Q² reaches or is below a predetermined value. Automatic regulating provisions of the character just described are especially useful in case the auxiliary heating means is employed to keep the engine warm enough over night or for indefinite periods to prevent freezing and to facilitate prompt starting at any time. In such case the switch X will open and interrupt the supply of electric heating current to the coil whenever the predetermined temperature in the pipe Q² is reached, and when thereafter the temperature in the pipe Q² falls, the switch X closes and the supply of current to the coil S is resumed. Similarly I may place a thermostat W' in the pipe N³ and employ it to energize an electromagnetic switch X' to open the energizing circuit for the heater S whenever the temperature in the pipe N³ reaches a predetermined value.

While in accordance with the provisions of the statutes I have illustrated and described herein the best forms of apparatus and modes of utilizing the same now known to me for carrying out my invention, it will be apparent to those skilled in the art that formal changes may be made in the methods and apparatus disclosed herein without departing from the spirit of my invention as set forth in the appended claims, and that certain features of my invention may sometimes be used to advantage without a corresponding use of other features.

Having now described my invention, what I claim as new and desire to secure by Letters Patent, is:

1. In an internal combustion engine comprising a cooling system of the boiling and condensing type and provisions for mixing fluid fuel with air for its combustion, the combination of means for superheating vapor from said cooling system with the engine exhaust gases and an oil vaporizer heated by the superheated vapor, and provided with a vapor outlet connected to said mixing provisions.

2. In an internal combustion engine, the combination of provisions for mixing fluid fuel with air for its combustion, means for heating said provisions by waste heat from the engine, with an oil chamber having a plurality of means for vaporizing the oil and having vapor and fluid fuel connections to said mixing provisions.

3. In an internal combustion engine, the combination of provisions for mixing fluid fuel with air for its combustion comprising an inner mixing chamber, air and vapor connections to said mixing chamber, an outer chamber surrounding said mixing chamber and a fluid fuel inlet to said outer chamber, with an oil chamber having means for heating said chamber and vapor and fluid fuel connections from said chamber to said mixing provisions.

Signed at New York in the county of New York and State of New York this 16th day of March A. D. 1922.

HARRY C. MALLORY.